United States Patent [19]
Ma

[11] Patent Number: 5,685,144
[45] Date of Patent: Nov. 11, 1997

[54] OPERATION OF AN INTERNAL COMBUSTION ENGINE

[75] Inventor: Thomas T. Ma, South Woodham Ferrers, United Kingdom

[73] Assignee: Ford Global Technologies, Inc., Dearborn, Mich.

[21] Appl. No.: 537,655

[22] PCT Filed: Feb. 16, 1994

[86] PCT No.: PCT/GB94/00311

§ 371 Date: Oct. 13, 1995

§ 102(e) Date: Oct. 13, 1995

[87] PCT Pub. No.: WO94/24423

PCT Pub. Date: Oct. 27, 1994

[30] Foreign Application Priority Data

Apr. 15, 1993 [GB] United Kingdom ............ 9307781

[51] Int. Cl.⁶ ............................................ F01N 3/20
[52] U.S. Cl. ........................ 60/274; 60/284; 60/289; 60/297
[58] Field of Search ............... 60/284, 297, 289, 60/274

[56] References Cited

U.S. PATENT DOCUMENTS 3,503,716  3/1970  Berger ................................ 60/297
5,379,586  1/1995  Honji .................................. 60/297
5,501,073  3/1996  Miyashita ........................... 60/297

*Primary Examiner*—Douglas Hart
*Attorney, Agent, or Firm*—Jerome R. Drouillard

[57] ABSTRACT

A method is described for operating an engine having an afterburner and a catalytic converter downstream of the afterburner. Sufficient excess fuel is introduced into the engine to produce in the exhaust gases fuel constituents including unburnt hydrocarbons, carbon monoxide and hydrogen. Unburnt hydrocarbons are intercepted upstream of the afterburner so as to allow substantially only carbon monoxide and hydrogen to reach the afterburner. Sufficient additional air is introduced into the exhaust system to bring the composition of only the carbon monoxide, hydrogen and air to stoichiometry or leaner than stoichiometry, the resulting concentration of hydrogen and oxygen in the mixture reaching the afterburner being sufficient for ignition immediately after a cold start.

By removing the hydrocarbons temporarily before the exhaust gases reach the afterburner, reliable cold ignition can be achieved with lower levels of fuel enrichment.

5 Claims, 1 Drawing Sheet

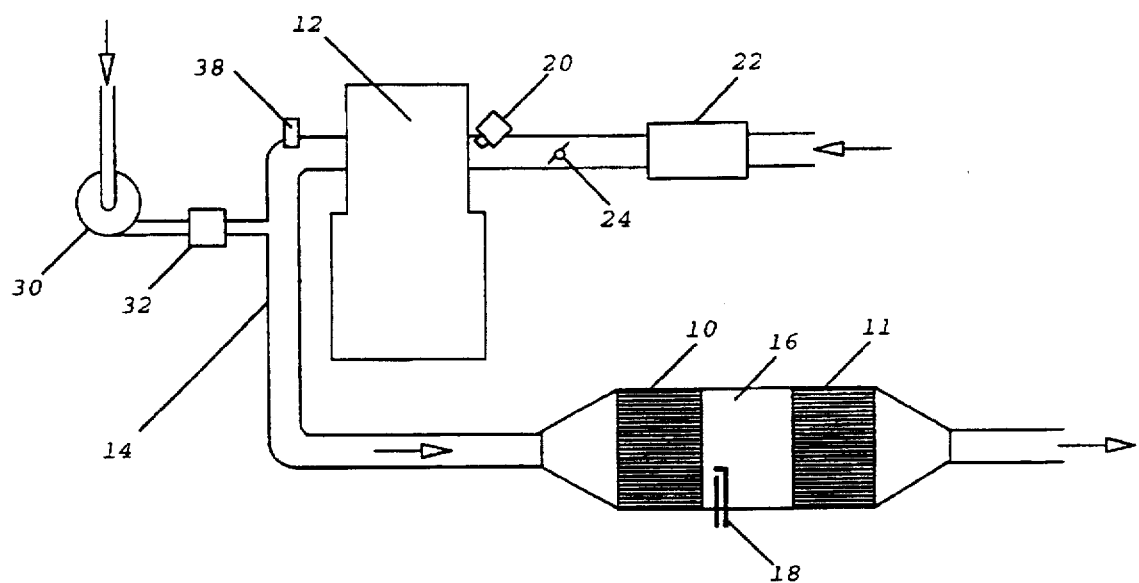

OPERATION OF AN INTERNAL COMBUSTION ENGINE

FIELD OF THE INVENTION

The present invention relates to the operation of an internal combustion engine fitted with a catalytic converter and having an exhaust gas ignition system for reducing the light-off time of the catalytic converter.

BACKGROUND OF THE INVENTION

PCT Patent Application WO 92/22734, of which the present invention is an improvement, discloses a method of reducing the total emissions during cold starts from an engine burning a hydrocarbon fuel and having an afterburner arranged upstream of a catalytic converter. The method comprises the steps of adding an excess of fuel to the engine combustible charge and adding air to reach the engine exhaust gases to assure the presence in the exhaust/air mixture immediately after the engine has first fired of sufficient concentrations of hydrogen and oxygen to permit the resulting exhaust/air mixture to be ignitable and to burn with a steady flame in the afterburner while the latter is at a temperature close to the ambient temperature, and igniting the exhaust/air mixture in the afterburner immediately after the engine has first fired.

A difficulty encountered in the above method of operating an engine is that the mixture required during cold starts is so rich that it can result in undesirable side effects such as plug fouling and running instability. For these reasons the exhaust gas ignition regime can only be maintained for a relatively short time after the engine has first fired and this result in only a relatively thin slice of the catalysis matrix being heated to its light-off temperature. Thereafter it is necessary to run in a modified regime to ensure that this slice remains hot and that the remainder of the catalysis matrix is brought to its light-off temperature.

OBJECT OF THE INVENTION

The present invention therefore seeks to provide a method of operating an engine that permits exhaust gas ignition to occur during cold starts with more moderate levels of fuel enrichment to the engine.

SUMMARY OF THE INVENTION

According to the present invention, there is provided a method of operating an engine having an afterburner and a catalytic converter downstream of the afterburner comprising the steps of introducing sufficient excess fuel to the engine to produce in the exhaust gases fuel constituents including unburnt hydrocarbons, carbon monoxide and hydrogen, intercepting the unburnt hydrocarbons upstream of the afterburner so as to allow substantially only carbon monoxide and hydrogen to reach the afterburner, introducing sufficient additional air into the exhaust system to bring the composition of only the carbon monoxide, hydrogen and air to stoichiometry or leaner than stoichiometry, the resulting concentration of hydrogen and oxygen in the mixture reaching the afterburner being sufficient for ignition immediately after a cold start, igniting the mixture in the afterburner with an ignition source, releasing the intercepted unburnt hydrocarbons to the afterburner after the ignition and introducing sufficient additional air into the exhaust system to bring the composition of the released unburnt hydrocarbons, carbon monoxide, hydrogen and air to stoichiometry or leaner than stoichiometry to ensure complete combustion within the exhaust system.

In the prior art proposal referred to above, oxygen was added to the system to bring the entire mixture reaching the afterburner to stoichiometry and for this purpose additional oxygen had to be introduced to react not only with the hydrogen and carbon monoxide that are vital to achieve cold ignition but also with the unburnt hydrocarbon content of the exhaust gases. The additional amount of air introduced for the purpose of reacting with the hydrocarbons reduced the hydrogen and carbon monoxide concentrations. For these to reach the critical limit required for cold ignition, the quantity of fuel injected to the engine had to be increased. It should be noted in this context that the concentrations of hydrogen and oxygen are critical in that cold ignition cannot occur if the hydrogen concentration is lower than 3% and the oxygen concentration is lower than 6%, by volume. For reliable ignition, a hydrogen concentration of between 5% and 6% at the afterburner is to be preferred.

In the present invention, the hydrocarbon content of the exhaust gases is not burnt during the exhaust gas ignition (hereinafter termed EGI) phase and is instead intercepted and temporarily stored so that only the carbon monoxide and hydrogen reach the afterburner. The amount of additional air necessary to achieve stoichiometry with the hydrocarbons removed from the exhaust mixture is therefore reduced. The reduced dilution enables a weaker mixture to be supplied to the engine cylinders during the EGI phase while still reaching the hydrogen concentrations necessary for EGI. It will be appreciated that it is not so much the oxygen required to react with the hydrocarbons that creates the dilution problem as the remaining nitrogen contained in the additional air, which has four times the volume of the oxygen.

Nitrogen constitutes the most significant diluent of the combustible gases but the exhaust gases also contain steam and carbon dioxide, the presence of which tends to reduce the hydrogen and oxygen concentrations. The same technique of temporary storage could be used for the steam and carbon dioxide, by suitable selection of a chemical trap, but the advantages to be gained are only of secondary importance.

The interception and storage of the hydrocarbons is preferably performed by means of a chemical trap. Chemical traps are already known and have been proposed for the purpose of sporing hydrocarbons until the catalytic converter reaches its light-off temperature. These traps, unlike the trap in the present invention, are usually placed downstream of the catalytic converter so as not to slow down the lighting-off of the catalytic converter and in order that the hydrocarbons stored in them should not be desorbed prematurely before the catalytic converter has reached its light-off temperature. After lighting off of the catalytic converter, the traps are purged by an air flow fed back into the exhaust system upstream of the catalytic converter. It is also only recently that chemical traps have become available that are capable of withstanding high temperatures and capable of being positioned, as in the present invention, upstream of the afterburner.

The interception may alternatively be purely a physical one relying on the condensation of the hydrocarbons onto a cold surface of large surface area. In either form of trap the hydrocarbons will automatically be released as the exhaust temperature rises in one case by desorption and in the other case by evaporation.

The construction of the hydrocarbon trap may in practice be generally similar to that of the matrix of a catalytic.

converter the difference residing essentially in the coating applied to the ceramic matrix. It is therefore possible to integrate the hydrocarbon trap into a catalytic converter matrix either by the entire matrix serving the dual function of chemical trap and catalytic converter, or by part of the matrix acting as a chemical trap while the other acts as a catalytic converter.

While the use of a chemical trap permanently in series with the afterburner is preferred, it is alternatively possible to provide a hydrocarbon trap in a bypass line the flow through which is controlled by valves in the exhaust system.

BRIEF DESCRIPTION OF THE DRAWING

The invention will now be described further, by way of example, with reference to the accompanying drawing which is a schematic representation of an engine having an HC trap, an afterburner and a catalytic converter.

DETAILED DESCRIPTION OF THE PREFERRED EMBODIMENT

In the drawing, an engine 12 has a intake manifold that includes an intake air flow meter 22, a butterfly valve 24 and fuel injectors 20. The engine also has an exhaust system comprising a down pipe 14 leading to a combined HC trap 10, afterburner 16 and catalytic converter 11. The combined converter is formed of two bricks 10, 11 separated from one another by the afterburner chamber 16 in which there is arranged an igniter in the form of a spark plug 18.

The engine also has an exhaust gas oxygen sensor 38 that is used during normal running conditions in controlling the fuelling of the engine, and an air pump 30 acting as a source of additional air for injecting air into the exhaust system through a valve 32, without the air passing through the engine combustion chambers.

The system as so far described is generally similar to that described in PCT Application WO92/22734, differing from it only in the construction of the combined HC trap, afterburner and catalytic converter. For this reason, the reader is referred to the earlier application for a fuller description of the system and only a summarised explanation will be given within the context of the present invention.

Under normal conditions, that is to say when the engine is hot, the air pump 30 is not operated and the exhaust gas oxygen sensor 38 is used to ensure that a stoichiometric fuel to air ratio is supplied to the combustion chambers. The brick 11 of the catalytic converter acts as a three way catalyst and at its normal running temperature it ensures that the carbon monoxide, oxides of nitrogen and hydrocarbons still present in the exhaust gases react with one another to produce only carbon dioxide, nitrogen and steam.

During start up from cold, the catalytic converter does not operate and an EGI regime is adopted to bring the brick 11 up to its light-off temperature as quickly as possible. During EGI, the injectors 20 inject much more fuel than is required for stoichiometry and this over fuelling creates hydrogen and carbon monoxide in the exhaust gases. The air pump 30 is operated and the flow of air is regulated by the valve 32 so that stoichiometry is now achieved within the exhaust system and, on reaching the afterburner chamber 16, this mixture is ignited by means of the spark plug 18 to heat the brick 11. At the same time, the combustion within the afterburner 16 itself consumes the noxious emissions that would otherwise have escaped past the cold catalytic converter brick 11.

In the prior proposal, the brick 10 in the catalytic converter was also constructed as a three way catalyst. In the present invention, however, the brick 10 is constructed to include a hydrocarbon trap that acts during initial start up to adsorb the hydrocarbons in the exhaust gases and to prevent them from reaching the afterburner chamber 16. The construction of a hydrocarbon trap can physically resemble the construction of a catalyst matrix, the difference residing in the washcoat applied to the ceramic matrix. It is possible therefore to form the first of the two bricks exclusively as a hydrocarbon trap or as a combined hydrocarbon trap and three way catalyst.

The effect of positioning a hydrocarbon trap upstream of the afterburner is that less oxygen is now required to be introduced into the exhaust system to achieve a stoichiometric mixture within the afterburner 16. Because less diluent enters the exhaust system, less hydrogen needs to be produced by the combustion in the engine to reach the concentrations essential for cold ignition. In this way, the invention allows exhaust gas ignition to occur with lesser levels of fuel enrichment.

By reducing the over fuelling to more tolerable levels the invention enables the EGI regime to be maintained for a more prolonged period. Furthermore the heat generated within the afterburner is less intense because only hydrogen and carbon monoxide are burnt. Therefore, the second brick 11 is heated by a gentler flame lasting a longer time which provides deeper penetration of the slice reaching its light-off temperature into the matrix and also reducing the risk of the front face of the catalytic matrix being damaged by overheating.

Adsorption of the hydrocarbons tends to take place when the first matrix is cold and removal of the hydrocarbon content of the exhaust gases is also assisted by condensation of the hydrocarbons on the large cold surface area of the capillaries within the first brick 10. As the temperature of the matrix 10 rises, the adsorbed fuel is desorbed and the condensed fuel is evaporated. At this time more oxygen is introduced into the exhaust system to restore the mixture within the afterburner chamber 16 to stoichiometry. By this time, the flame within the afterburner will have been extinguished by reducing the fuel enrichment to the engine and instead the gases will react exothermically with one another in the second brick 11 to spread the slice that has reached light-off temperature until it should occupy the entire matrix 11.

There are currently available hydrocarbon traps that will survive in the position of the brick 10 in the catalytic converter housing but it is alternatively possible to use a lower temperature trap and to position it within a bypass line through which the exhaust gases are diverted by valves during the EGI regime.

As well as acting as a hydrocarbon trap and catalytic converter, the first brick 10 in the configuration illustrated assists in ensuring a laminar flow of gases for improving the combustion in the afterburner and also acts as a flame trap to prevent the flame within the afterburner from spreading back up the exhaust pipe.

It can be seen from the foregoing that the present invention improves over the earlier EGI proposal by reducing the levels of fuel enrichment necessary to achieve a flame in the afterburner without adding to the complexity and the size of the system.

I claim:

1. A method of operating an engine having an afterburner and a catalytic converter downstream of the afterburner comprising the steps of introducing sufficient excess fuel to the engine to produce in the exhaust gases fuel constituents including unburnt hydrocarbons, carbon monoxide and hydrogen, intercepting the unburnt hydrocarbons upstream of the afterburner so as to allow substantially only carbon monoxide and hydrogen to reach the afterburner, introducing sufficient additional air into the exhaust system to bring the composition of only the carbon monoxide, hydrogen and air to stoichiometry or leaner than stoichiometry, the resulting concentration of hydrogen and oxygen in the mixture reaching the afterburner being sufficient for ignition immediately after a cold start, igniting the mixture in the afterburner with an ignition source, releasing the intercepted unburnt hydrocarbons to the afterburner after the ignition and introducing sufficient additional air into the exhaust system to bring the composition of the released unburnt hydrocarbons, carbon monoxide, hydrogen and air to stoichiometry or leaner than stoichiometry to ensure complete combustion within the exhaust system.

2. A method as claimed in claim 1, which further comprises intercepting steam and carbon dioxide to reduce further the proportion of non-combustible diluents in the gases reaching the afterburner.

3. A method as claimed in claim 1, which comprises placing a chemical trap permanently in series with the afterburner and forming the trap of a material capable of withstanding the normal exhaust gas operating temperatures.

4. A method as claimed in claim 1, which comprises placing a chemical trap in a by-pass line through which exhaust gases are diverted only during cold engine operation.

5. A method as claimed in claim 3, which comprises forming the chemical trap integrally with the first brick of a two-brick catalytic converter and forming the afterburner in the chamber between the two bricks.

* * * * *